Patented June 6, 1950

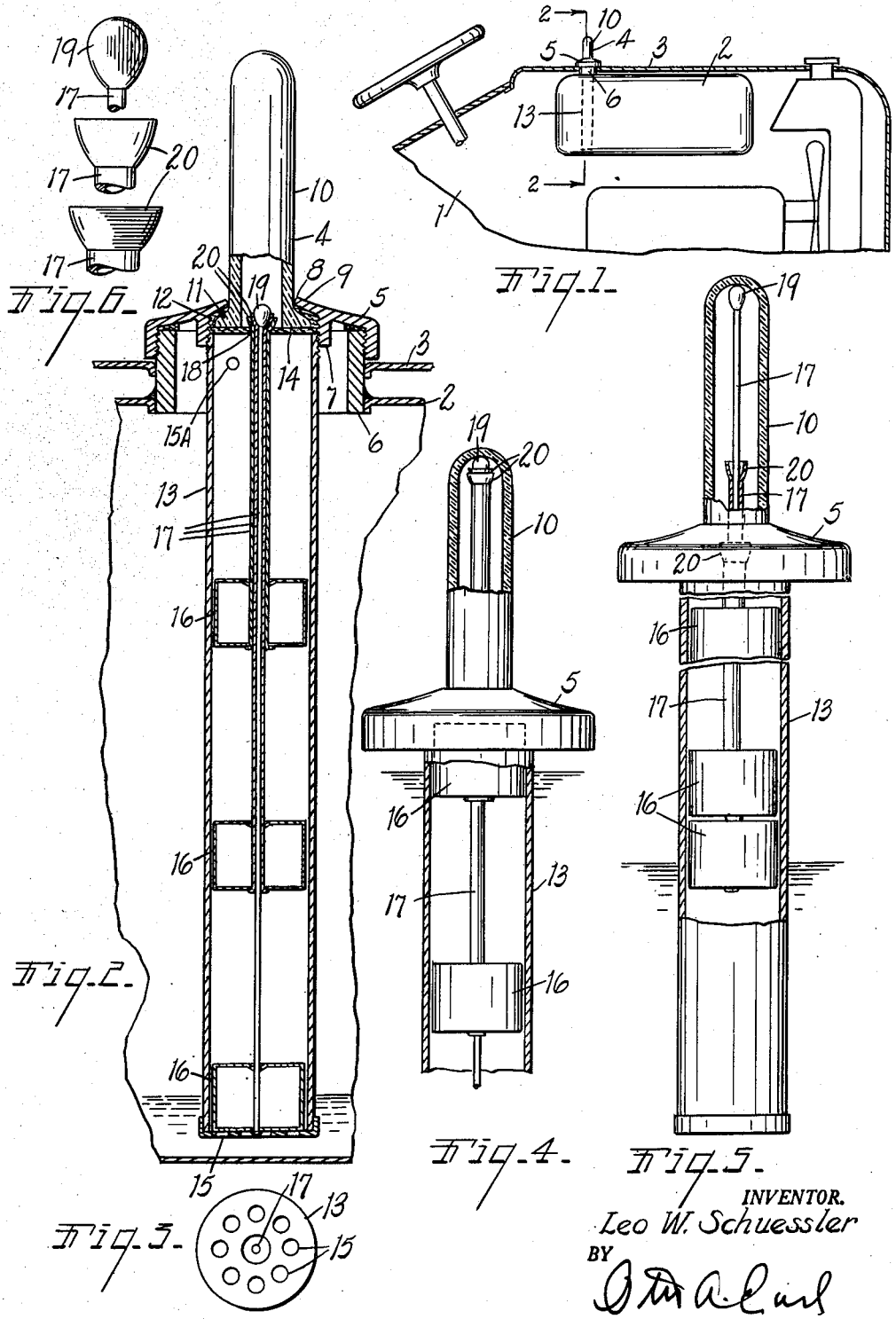

2,510,663

UNITED STATES PATENT OFFICE 2,510,663

TANK GAUGE

Leo W. Schuessler, Lawton, Mich., assignor of one-half to Horace Hayne, Lawton, Mich.

Application January 17, 1947, Serial No. 722,720

9 Claims. (Cl. 73—311)

This invention relates to improvements in a tank gauge.

The principal objects of this invention are:

First, to provide a simplified tank gauge of the multiple float direct reading type which projects only a short distance above the tank and is securely sealed against the escape of vapor from the tank.

Second, to provide novel means for mounting and sealing a sight tube for a multiple float gauge on the filler cap or other portion of a tank.

Third, to provide a novel indicating assembly on the ends of the sight rods of a multiple float gauge which assembly renders the gauge readily readable from any direction.

Fourth, to provide a gauge of the type described which is inexpensive to manufacture and pleasing in appearance.

Other objects and advantages pertaining to the details and economies of the invention will be apparent from a consideration of the following description and claims.

The drawings, of which there is one sheet, illustrate a preferred form of my gauge as applied to the fuel tank of a tractor.

Fig. 1 is a fragmentary longitudinal cross sectional view of a tractor showing the gauge applied to the fuel tank of the tractor.

Fig. 2 is a fragmentary vertical cross sectional view along the line 2—2 in Fig. 1 and showing the fuel tank nearly empty.

Fig. 3 is a bottom view of the guide tube of the gauge shown in Fig. 2.

Fig. 4 is a fragmentary cross sectional view similar to Fig. 2 but showing the tank full of fuel with the gauge indicating a corresponding reading.

Fig. 5 is a fragmentary cross sectional view similar to Figs. 2 and 4 but illustrating the tank slightly over one-third full.

Fig. 6 is a fragmentary exploded elevational view showing the details of construction of the indicator portions of the sight rods shown in Figs. 3, 4 and 5.

The simplest form of liquid gauge for a tank is a float provided with a sight rod which projects through the top of the tank and rises and falls with the float as the liquid level in the tank changes. This type of gauge has the disadvantage, particularly objectionable on moving vehicles, of requiring a sight rod that is equal in length to the depth of the tank and which projects almost entirely above the tank when the tank is full. To overcome this objection gauges have been developed that have a plurality of floats each with a sight rod of different length which is effective to indicate the level of the liquid throughout a portion of the depth of the tank. Since the longer rods for indicating the level in the lower portions of the tank are visible when the tank is almost full, more or less complicated devices have been employed to indicate which of the several rods is showing the true level in the tank. My gauge simply and clearly shows which rod is effectively indicating the level in the tank and is further easily mounted on the tank with an airtight connection which prevents the escape of vapor from the tank.

The drawings illustrate more or less conventionally a tractor 1 having a fuel tank 2 mounted underneath the hood panel 3. My gauge generally indicated at 4 is mounted on the filler cap 5 which is threadedly connected to the filler spout 6 of the tank. The cap 5 is provided with an internally threaded annular flange 7 on its under side and defines a central aperture 8 with a lip 9 extending therearound.

A transparent sight tube 10 having a closed upper end and an outwardly flanged lower end extends through the aperture 8 with the flange 11 lapped underneath the lip 9 on the cap. A gasket 12 is interposed between the lip and the flange to form an airtight seal around the aperture 8. A guide tube 13 has its upper end threaded in the annular flange 7 and bearing against a stop disk 14 to press the disk against the bottom of the sight tube and the gasket 12. The lower end of the guide tube extends to adjacent to the bottom of the tank and is perforated as at 15 to permit the fuel in the tank to rise to an equal level in the tube. An air vent 15A is provided near the top of the tube.

Positioned in the guide tube 13 are three floats 16, each of which is connected to its own sight rod 17. The sight rods 17 are slidable telescopically with respect to each other, the inner rod being preferably but not necessarily solid and the other rods having tubular cross sections of graduated size. The upper ends of the sight rods extend upwardly through an aperture 18 in the stop disk 14, the inner rod being provided with a generally ball-shaped end 19 and the outer rods being flared or belled to form nesting cup shaped ends 20. The inner cup 20 nestingly receives the ball end 19 and in turn is received in the cupped end of the outer rod when the tank is empty.

The sight rods 17 are of different lengths, preferably successive common fractional dimensions of the depth of the tank. In the example illustrated the outer rod is one-third the depth of the tank, the middle rod is two-thirds the depth of the tank, and the inner rod is approximately equal to the depth of the tank. When the tank is full as shown in Fig. 4 all the floats and sight rods will rise until the ball end 19 strikes the top of the sight tube 10 and the cupped ends nest around the inner side of the ball. It will be noted that the inner cup 20 is slightly higher than the other cup 20 so that the inner cup will be visible above the outer cup when they are both at the top of their travel. Preferably the cupped ends and ball end carry different color insignia as shown conventionally in Fig. 6, the ball end 19 being shown as red, the inner cup being shown as white, and the outer cup being shown as blue.

As the level of the fuel falls in the tank the floats and sight rods will fall successively, the outer sight rod falling first until its cupped end 20 engages the stop disk 14. The middle float and sight rod will then fall with continued lowering of the fuel level as shown in Fig. 5 and eventually the bottom float and inner sight rod will fall to the position shown in Fig. 2.

Anyone observing the sight tube 10 can easily tell by the relative positions of the cupped ends 20 and ball end 19 what the level of the fuel in tank is. The gauge is readable with equal ease from the front, back and sides of the tractor, and the sight tube extends only a relatively short distance above the level of the hood 3 so as not to obstruct the vision of the driver. The gauge is equally effective on any tank and has particular advantages when used on the fuel tanks of light airplanes where the projection of a single long sight rod into the slip stream is liable to cause objectionable vibration and malfunctioning of the gauge.

I have described one highly practical commercial embodiment of my gauge and have not attempted to show other possible adaptations thereof. Obviously, the number of floats and sight rods may be varied and the length of the sight rods and size of the cap may be made to fit any depth of tank and size of filler spout. If desired the member 5 may be secured in a more permanent fashion to a different portion of the tank than the filler spout 6.

Having thus described the invention, what is claimed as new and desired to secure by Letters Patent is:

1. A tank gauge comprising a cap having a pair of internally threaded annular flanges concentrically located on one side thereof, the outer of said flanges being arranged to engage the filler spout of a tank, said cap defining a central aperture spaced from said other flange to form a lip therearound, a transparent sight tube having a closed upper end and a shouldered lower end extending through said aperture with said shoulder engaging the inner side of said lip, a gasket interposed between said shoulder and lip, a stop disk positioned within the inner of said annular flanges and bearing against the ends of said sight tube and gasket, said disk defining a hole concentric with said sight tube, a guide tube having its upper end threaded in said inner flange and clamping said disk against said sight tube, said guide tube being arranged to extend to adjacent to the bottom of the tank, a plurality of indicator rods positioned in relatively slidable telescopic relation and extending through said hole in said disk, said rods being of regularly graduated length, the inner of said rods being the longest and approximately as long as said guide tube, floats secured around the lower ends of said rods and slidable in said guide tube, a ball-like indicator on the top of the inner of said rods and flared cup-shaped indicators on the ends of the others of said rods, said cup-shaped indicators being arranged to nest with each other and with said ball indicator, the outer of said cup-shaped indicators being engageable with the edge of said hole in said disk to limit downward movement of said rods and floats, said guide tube being apertured to permit liquid in the tank to assume its level in said guide tube, said indicators being of different length so that all said indicators are visible while in nested position.

2. A tank gauge comprising a cap having a pair of threaded annular flanges located on one side thereof, the outer of said flanges being arranged to engage a tank, said cap defining a central aperture spaced from said other flange to form a lip therearound, a transparent sight tube having a closed upper end and a shouldered lower end extending through said aperture with said shoulder engaging the inner side of said lip, a stop disk positioned within the inner of said annular flanges and bearing against the end of said sight tube, said disk defining a hole opening to said sight tube, a guide tube having its upper end threaded on said inner flange and clamping said disk against said sight tube, a plurality of indicator rods positioned in relatively slidable telescopic relation and extending through said hole in said disk, said rods being of graduated length, the inner of said rods being the longest, floats secured to the lower ends of said rods and slidable in said guide tube, a ball-like indicator on the top of the inner of said rods and cup-shaped indicators on the ends of the others of said rods, said cup-shaped indicators being arranged to nest with each other and with said ball indicator, the outer of said cup-shaped indicators being engageable with the edge of said hole in said disk to limit downward movement of said rods and floats, said guide tube being apertured to permit liquid in the tank to assume its level in said guide tube.

3. Means for attaching a multi-float direct reading gauge to a tank comprising a cap member arranged to be secured to the tank, an internally threaded flange on the bottom of said cap, said cap defining an aperture with a lip therearound and concentric with said flange, a transparent sight tube having a closed upper end and a shouldered lower end positioned against the inside of said lip, a gasket positioned between said lip and the shoulder of said tube, a guide tube for said floats threaded in said flange and having a portion of its upper end clamping said gasket and sight tube against said lip, and a disk extending across the open end of said sight tube and having its edge clamped between said guide tube and said sight tube, said floats having telescopically slidable sight rods secured thereto and extending upwardly through the aperture in said disk.

4. Means for attaching a multi-float direct reading gauge to a tank comprising a cap member arranged to be secured to the tank, a threaded flange on the bottom of said cap, said cap defining an aperture with a lip therearound, a transparent sight tube having a closed upper end and a shouldered lower end positioned against the inside of said lip, and a guide tube for said floats threaded on said flange and having a portion of its upper end clamping said sight tube against said lip, said floats having telescopically slidable sight rods secured thereto.

5. Means for attaching a multi-float direct reading gauge to a tank comprising a cap member arranged to be secured over an opening in the tank, an annular flange on the under side of said cap, said cap defining an aperture with a radial lip therearound and within said flange, a transparent sight tube having a closed end and extending through said aperture, a radial flange on the other end of said sight tube and lapped under said lip, a guide member secured to said annular flange and clamping said radial flange against said lip, a stop disc interposed between said guide member and sight tube, a plurality of floats slidable in said guide member and a plurality of telescopically positioned sight rods of different lengths secured one to each of said floats and extending upwardly into said sight tube through said stop disc.

6. Means for attaching a multi-float direct reading gauge to a tank comprising a cap member arranged to be secured over an opening in the tank, an annular flange on the under side of said cap, said cap defining an aperture with a radial lip therearound and within said flange, a transparent sight tube having a closed end and extending through said aperture, a radial flange on the other end of said sight tube and lapped under said lip, a guide member secured to said annular flange and clamping said radial flange against said lip, a plurality of floats slidable in said guide member and a plurality of telescopically positioned sight rods of different lengths secured one to each of said floats and extending upwardly into said sight tube.

7. A tank gauge comprising a mounting fixture, a guide tube depending therefrom, said guide tube having a liquid ingress and egress opening at the bottom and a vent opening at its upper end and being otherwise closed, a sight tube mounted on said mounting fixture in alignment with said guide tube, a plurality of floats arranged in said guide tube one above another for independent vertical movement, a plurality of indicator rods of graduated lengths arranged in relatively slidable telescopic relation, the inner rod being the longer, indicators mounted on the upper ends of said rods, said indicators being adapted to nestingly collapse one within the other when in fully retracted position, and a stop disk at the bottom of said sight tube engageable with the lower of said indicators to support said floats at various levels when the liquid level successively falls below said floats, the larger indicator being carried by the outer and shorter indicator rod.

8. A tank gauge comprising a mounting fixture, a guide tube depending therefrom, said guide tube having a liquid ingress and egress opening at the bottom and a vent opening at its upper end and being otherwise closed, a sight tube mounted on said mounting fixture in alignment with said guide tube, a plurality of floats arranged in said guide tube one above another for independent vertical movement, a plurality of indicator rods of graduated lengths arranged in relatively slidable telescopic relation, indicators mounted on the upper ends of said rods, said indicators being adapted to nestingly collapse one within the other when in fully retracted position, and a stop disk at the bottom of said sight tube engageable with the lower of said indicators to support said floats at various levels when the liquid level successively falls below said floats, the larger indicator being carried by the outer and shorter indicator rod.

9. A tank gauge comprising a mounting fixture, a guide tube depending therefrom, said guide tube having a liquid ingress and egress opening at the bottom and a vent opening at its upper end and being otherwise closed, a sight tube mounted on said mounting fixture in alignment with said guide tube, a plurality of indicator rods of graduated lengths arranged in relatively slidable telescopic relation and provided with floats at their inner ends slidable within said guide tube, indicators mounted on the upper ends of said rods, said indicators being adapted to nest when in fully retracted position, and a stop disk at the bottom of said sight tube engageable with the lower of said indicators to support said floats at various levels when the liquid level successively falls below said floats.

LEO W. SCHUESSLER.

REFERENCES CITED

The following references are of record in the file of this patent:

UNITED STATES PATENTS

| Number | Name | Date |
| --- | --- | --- |
| 1,185,985 | Clewell | June 6, 1916 |
| 1,193,744 | Wilkinson | Aug. 8, 1916 |
| 1,435,986 | Scoville | Nov. 21, 1922 |
| 2,255,310 | D'Arcey | Sept. 9, 1941 |

FOREIGN PATENTS

| Number | Country | Date |
| --- | --- | --- |
| 504,798 | France | Apr. 22, 1920 |